US012572774B2

(12) United States Patent
Yousefzadeh et al.

(10) Patent No.: US 12,572,774 B2
(45) Date of Patent: Mar. 10, 2026

(54) NEURAL NETWORK PROCESSOR AND METHOD OF NEURAL NETWORK PROCESSING

(71) Applicant: Snap Inc., Santa Monica, CA (US)

(72) Inventors: Amirreza Yousefzadeh, Eindhoven (NL); Louis Rouillard-Odera, Paris (FR); Gokturk Cinserin, Son en Breugel (NL); Orlando Miguel Pires Dos Reis Moreira, Eindhoven (NL)

(73) Assignee: Snap Inc., Santa Monica, CA (US)

( * ) Notice: Subject to any disclaimer, the term of this patent is extended or adjusted under 35 U.S.C. 154(b) by 873 days.

(21) Appl. No.: 17/786,410

(22) PCT Filed: Dec. 17, 2020

(86) PCT No.: PCT/EP2020/086846
§ 371 (c)(1),
(2) Date: Jun. 16, 2022

(87) PCT Pub. No.: WO2021/123035
PCT Pub. Date: Jun. 24, 2021

(65) Prior Publication Data
US 2023/0035620 A1      Feb. 2, 2023

(30) Foreign Application Priority Data

Dec. 17, 2019      (EP) .................................... 19217091

(51) Int. Cl.
*G06N 3/04*          (2023.01)
*G06F 18/2113*       (2023.01)

(52) U.S. Cl.
CPC ........... *G06N 3/04* (2013.01); *G06F 18/2113* (2023.01)

(58) Field of Classification Search
CPC .......... G06N 3/04; G06N 3/096; G06N 3/047; G06N 3/0464; G06F 18/2113–2115
See application file for complete search history.

(56) References Cited

U.S. PATENT DOCUMENTS 9,460,387 B2 *  10/2016  Sinyavskiy ............. G06N 3/049
10,949,737 B2 *  3/2021  Lee ......................... G06N 3/044
(Continued)

FOREIGN PATENT DOCUMENTS

| EP | 3270330 A1 | 1/2018 |
| EP | 3839829 | 6/2021 |
| WO | 2021123035 | 6/2021 |

OTHER PUBLICATIONS

European Patent Office, International Search Report in corresponding International Application No. PCT/EP2020/086846, dated Mar. 5, 2021 (3 pages).
(Continued)

*Primary Examiner* — Jennifer Mehmood
(74) *Attorney, Agent, or Firm* — Schwegman Lundberg & Woessner, P.A.

(57) ABSTRACT

A neural network processor is provided comprising a plurality of mutually succeeding neural network processor layers is provided. A neural network processor layer therein comprising a plurality of neural network processor elements (1) having a respective state register (2) for storing a state value (X) indicative for their state, as well as an additional state register (4) for storing a value (Q) of a state value change indicator that is indicative for a direction of a previous state change exceeding a threshold value. Neural network processor elements in a neural network processor layer are configured to selectively transmit differential event messages indicative for a change of their state, dependent
(Continued)

1000 both on the change of their state value and on the value of their state value change indicator.

20 Claims, 7 Drawing Sheets

(56) References Cited

U.S. PATENT DOCUMENTS

| | | | | |
|---|---|---|---|---|
| 10,977,550 | B2 * | 4/2021 | Ruckauer | G06N 3/04 |
| 2015/0372805 | A1 * | 12/2015 | Yoon | H04L 25/02 |
| | | | | 375/358 |

OTHER PUBLICATIONS

Amirreza Yousefzadeh et al., "Conversion of Synchronous Artificial Neural Network to Asynchronous Spiking Neural Network Using Sigma-Delta Quantization," 2019 IEEE International Conference on Artificial Intelligence Circuits and Systems (AICAS), pp. 81-85, XP033578910.

Yunhui Guo, "A Survey on Methods and Theories of Quantized Neural Networks," arxiv.org, Cornell University Library, Ithaca, NY 14853, Aug. 13, 2018, XP081179770 (17 pages).

"International Application Serial No. PCT/EP2020/086846, Written Opinion mailed Mar. 5, 2021", 6 pgs.

"International Application Serial No. PCT/EP2020/086846, International Preliminary Report on Patentability mailed Jun. 30, 2022", 8 pgs.

"European Application Serial No. 19217091.8, Extended European Search Report mailed Jun. 15, 2020", 8 pgs.

"European Application Serial No. 19217091.8, Noting of loss of rights pursuant to Rule 112(1) EPC mailed Jan. 25, 2022", 2 pgs.

"New international patent application in the name of GrAI Matter Labs S.A.S. claiming priority from EP 19217091.8 filed on Dec. 17, 2019", PCT Direct / informal comments filed Dec. 17, 2020, 8 pgs.

* cited by examiner

Output: vehicle control

Fully-connected layer

Fully-connected layer

Fully-connected layer

Convolutional
feature map
64@1x18

Convolutional
feature map
64@3x20

Convolutional
feature map
48@5x22

Convolutional
feature map
36@14x47

Convolutional
feature map
24@31x98

Normalized
input planes
3@66x200

Input planes
3@66x200

1000

FIG. 2                    *Message* $\Delta O(t)$

FIG. 4

$$\lfloor X \rfloor = MSB(m,n,X) \qquad \lfloor X' \rfloor = MSB(m,n,X')$$

NEURAL NETWORK PROCESSOR AND METHOD OF NEURAL NETWORK PROCESSING

CROSS-REFERENCE TO RELATED APPLICATIONS

This patent application is a U.S. National Phase of PCT International Application No. PCT/EP2020/086846, filed Dec. 17, 2020, which claims priority to European Application No. 19217091.8, filed Dec. 17, 2019, which are both expressly incorporated by reference in their entireties, including any references contained therein.

BACKGROUND

The present application relates to a neural network processor.

The present application further relates to a method of neural network processing.

Artificial Neural Networks (ANNs) show great performance in several data analysis tasks including visual and auditory applications. However, direct implementation of these algorithms without considering the sparsity of data requires high processing power, consumes vast amounts of energy and suffers from scalability issues. Yousefzadeh et al. address these concerns in "Conversion of Synchronous Artificial Neural Network to Asynchronous Spiking Neural Network using sigma-delta quantization", Conference Paper March 2019 DOI: 10.1109/AICAS.2019.8771624. According to the approach described therein, asynchronous spikes are used to communicate the quantized output activations of the neural network processor elements (also denoted as neurons). In this paper it is recognized that direct quantization would result in an excessive firing activity of spiking neurons. The reason is that for quantizer input values X near the transition point of two quantization levels, small variations/oscillations in X may result in several big changes in the quantized Y which is not desirable. To mitigate this risk, the output of the "Hysteresis Quantizer" as proposed in the conference paper depends not only on the current input value but also on the previous value of its output. It is however a disadvantage of this known approach that it requires a relatively large storage space for each neuron, i.e. it requires that in addition to the current state also the quantized value of the previous state is stored. Accordingly, there is a need to a solution that maintains the advantages of this known approach, while mitigating the storage requirements.

SUMMARY

In accordance with this need a neural network processor is provided and a method of neural network processing is provided.

The neural network processor comprises a plurality of mutually succeeding neural network processor layers and each neural network processor layer comprising a plurality of neural network processor elements having a respective state register for storing a state value X indicative for their state.

Neural network processor elements in a neural network processor layer are capable of transmitting differential event messages indicating a change of their state to neural network processor elements in a succeeding neural network processor layer in accordance with an activation function. A neural network processor element having a state value receiving at its input an input event message from another neural network processor element is configured to compute a new state value of its state in accordance with the input message. It selectively generates an output event message dependent on the change of its state value.

The neural network processor element comprises an additional state register for storing a value of a state value change indicator that is indicative of a direction of a previous state change exceeding a threshold value, wherein selectively generating an output event message is further dependent on the value of said indicator. Hence, contrary to the known approach, only one bit needs to be stored in addition to the state value. Therewith a substantial reduction of storage space is required, whereas an excessive "spiking" is avoided.

In an embodiment, a plurality of neural network processor elements is organized as a cluster, wherein the plurality of neural network processor elements shares a common computation unit. As the number of messages that is generated may be small, this optional further measure is particularly favorable. Due to the relatively low number of messages, the plurality of neural network processor elements can be efficiently kept updated by the common computation unit in a time-shared manner.

The plurality of neural network processor elements organized in the cluster may further share a common message buffer.

Also the plurality of neural network processor elements organized in the cluster may further share a common output unit.

Furthermore, the plurality of neural network processor elements organized in the cluster may share a common network interface.

In an embodiment a plurality of neural network processor elements organized in the cluster may form a neural network processor layer in the neural network processor. This is advantageous in that in practice, most message transfers will take place from a layer to a next layer. Therewith transmission of messages from a neural network processor element to its recipient neural network processor elements can take place efficiently. For example, a neural network processor element may send a single message to the cluster forming the next neural network processor layer, and the single message may be broadcasted inside the latter cluster to the recipient neural network processor elements.

In an embodiment a neural network processor element comprises a first computation subsection to compute a control signal indicative for a significant change of its state value, a second computation subsection to compute a modified control signal indicative of a significant change taking into account a previous significant change, and a third computation subsection to generate an output message. The neural network processor element may be configured such that the second computation section is only activated upon the condition that the control signal indicates a significant change of the state value, and such that the third computation section is only activated upon the condition that both the control signal indicates a significant change of the state value and the modified control signal indicates a significant change. Therewith the average computation load as well as the average computation time can be substantially reduced. The computation subsections are respective program modules in a program that causes a programmable processor to perform the computations. Alternatively, the computation subsections may be hardware modules in a dedicated computation unit.

The neural network processor may have an input for receiving sensor data, and an output to provide device control signals and be employed as a control system.

The control system may comprise a normalization unit to normalize the received sensor data, for example to accommodate for changing illumination conditions where image data is received as the sensor data.

The control system may further comprise an event generation unit to convert received sensor data into event data. Alternatively, a sensor may be used that provides its sensor data as event data.

A controlled device may include the control system in addition to at least one sensor unit to provide the control system with sensor data and a device to receive the device control signals.

BRIEF DESCRIPTION OF THE DRAWINGS

These and other aspects are described in more detail with reference to the drawing. Therein:

FIG. 4 schematically shows an improved method of operating a neural network processor according to the present invention;

DETAILED DESCRIPTION OF EMBODIMENTS

Like reference symbols in the various drawings indicate like elements unless otherwise indicated.

Figure 1:
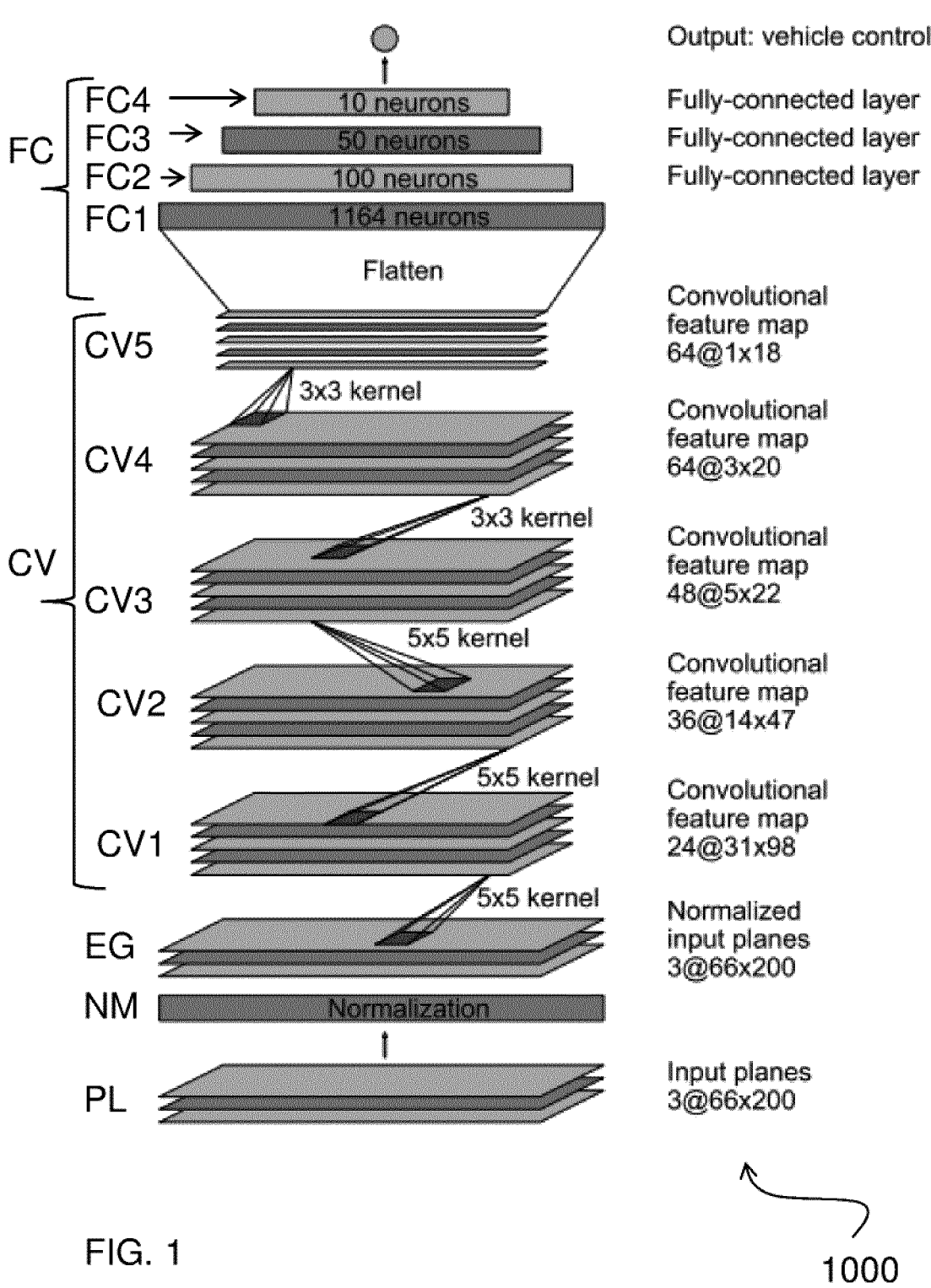
FIG. 1 schematically shows an embodiment of a neural network that can be mapped onto a neural network processor comprising a plurality of mutually succeeding neural network processor layers, FIG. 2 schematically shows a first method of operating a neural network processor not according to the present invention.

FIG. 1 schematically shows an exemplary an embodiment of a neural network that can be mapped onto a neural network processor 1000. The exemplary neural network comprises a plurality of mutually succeeding neural network processor layers. In this example the neural network processor comprises a total of 10 layers, including 5 fully connected layers FC1, FC2, FC3, FC4 and 5 convolutional layers CV1, CV2, CV3, CV4, CV5. In this example RGB data from an input plane PL with a resolution of 66×200 pixels is normalized in normalization unit NM, and converted to localized event data in conversion unit EG, such that an event-message E(t,x,y) for a pixel with coordinates x,y is provided at point in time t to the first convolutional layer CV1 if an event decision function indicates that a significant change occurred for said pixel. This may for example be the case if a sum of absolute differences for the color coordinates (R,G,B) in a corresponding color plane exceeds a threshold value Th.

i.e. if $|R(t)-R(t-1)|>Thr$ if $|G(t)-G(t-1)|>Thg$ if $|B(t)-B(t-1)|>Thb$

Optionally Thr=Thg=Thb

In this example the neural network processor has a total of 108K neural processor elements, and 1.6 M parameters.

Parameters are the individual weights. The number of weights for a layer typically is the product of the number of channels in that layer, the number of channels of the previous layer and the size of the kernel. So for the first layer between EG and CV1 the following number NW of weights is computed:

$$NW=24(\text{channel in the same layer})*(5*5)(\text{kernel size})*3(\text{channel of previous layer}).$$

In an embodiment the weights may be determined by supervised learning with Stochastic Gradient Descent algorithm.

Specific data for the exemplary neural network processor is provided in the following table.

| LAYER | Resolution | K | NF |
|-------|-----------|------|------|
| CV1 | 31 × 98 | 5 × 5 | 24 |
| CV2 | 14 × 47 | 5 × 5 | 36 |
| CV3 | 5 × 22 | 5 × 5 | 48 |
| CV4 | 3 × 20 | 3 × 3 | 64 |
| CV5 | 1 × 18 | 3 × 3 | 64 |
| FC1 | | | 1104 |
| FC2 | | | 100 |
| FC3 | | | 50 |
| FC4 | | | 10 |

For example, the first convolutional layer CV1 uses a 5×5 convolution kernel to compute a feature map having a resolution of 31×98 pixels for 24-dimensional (NF) local feature vector. The first fully connected layer FC1 has 1104 neural network processor elements to each compute a respective global feature.

The neural network processor elements in the various layers have a respective state register for storing a state value (X) indicative for their state.

The neural network processor elements may be provided as fully autonomous units that are capable of storing their own state and of updating that state in response to received input messages and optionally as a function of time. Such autonomous functionality may be provided by dedicated hardware, by suitably programmed general purpose processing elements, by suitably configured reconfigurable elements or by a combination thereof. Alternatively part of their functionality may be shared. For example each neural network processor element may comprise a proper memory location in a memory unit and a plurality of neural network processor elements may share a common processor to update their states in response to received input messages and optionally as a function of time. The shared processor may be provided as dedicated hardware, by a suitably programmed general purpose processor, by a suitably configured reconfigurable processor or by a combination thereof. By way of example neural network processor elements in a layer may share such a processor.

The neural network processor is arranged as a differential value message network, in that at least part of neural network processor elements are configured to transmit differential event messages indicative for a change of their state to neural network processor elements in a succeeding neural network processor layer, and only if the magnitude of the state change is sufficiently large.

Figure 2:
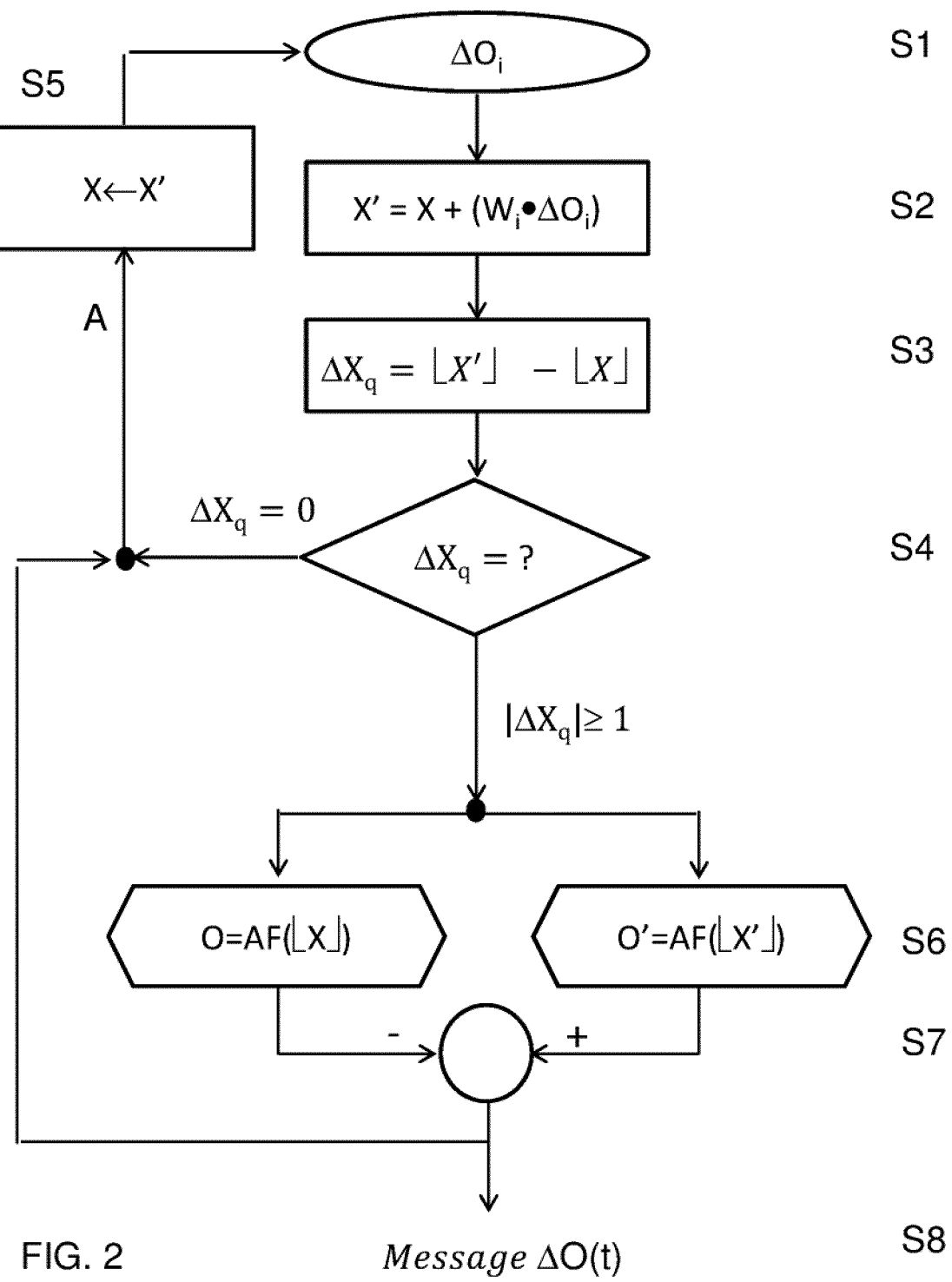

FIG. 2 shows a first approach which could be contemplated. Therein in step S1, a differential value message $\Delta O_i$ is received by a neural network processor element at an input i. At the point in time that the neural network processor element receives the differential value message $\Delta O_i$, its state has the value X. In step S2 an updated state value X' is computed, for example with the function:

$$X'=X+Wi*\Delta O_i,$$

wherein Wi, is a weight for said input i. Alternatively other functions may be contemplated to compute the updated state value X'.

Subsequently in step S3 a quantized difference $\Delta X_q$ is computed as the difference between the quantized value $\lfloor X' \rfloor$ of the updated state value X' and the quantized value $\lfloor X \rfloor$ of the state value X prevailing at the time of receipt of the differential value message $\Delta O_i$. These variables will further be denoted respectively as quantized updated state value and quantized original state value. The updated state value and original state value may for example be represented as a 16-bit signed integer and these values may be quantized by keeping only a number of most significant bits, e.g. the 5 most significant bits.

Therewith the quantized original state value $\lfloor X' \rfloor$ is determined as:

$$\lfloor X' \rfloor = X' >> m, \text{ wherein } m \text{ is the number of least sig-}$$
$$\text{nificant bits that is ignored,}$$

and $$\lfloor X \rfloor = x >> m,$$

$$\text{Hence, } \Delta X_q = \lfloor X' \rfloor - \lfloor X \rfloor$$

In step S4 it is determined whether the quantized difference $\Delta X_q$ is different from zero. If this is not the case, the updated state value X' is denoted as the original state value X. If indeed the quantized difference $\Delta X_q$ is different from zero, then in step S6 the activation function is applied to each of the quantized updated state value $\lfloor X' \rfloor$ and the quantized original state value $\lfloor X \rfloor$ and the difference value $\Delta O(t)$ is computed in step S7 to be transmitted in step S8 as a message Message $\Delta O(t)$. The value of the actuation function AF may for example be determined with look-up table indexed with the quantized difference $\Delta X_q$.

Figure 3:
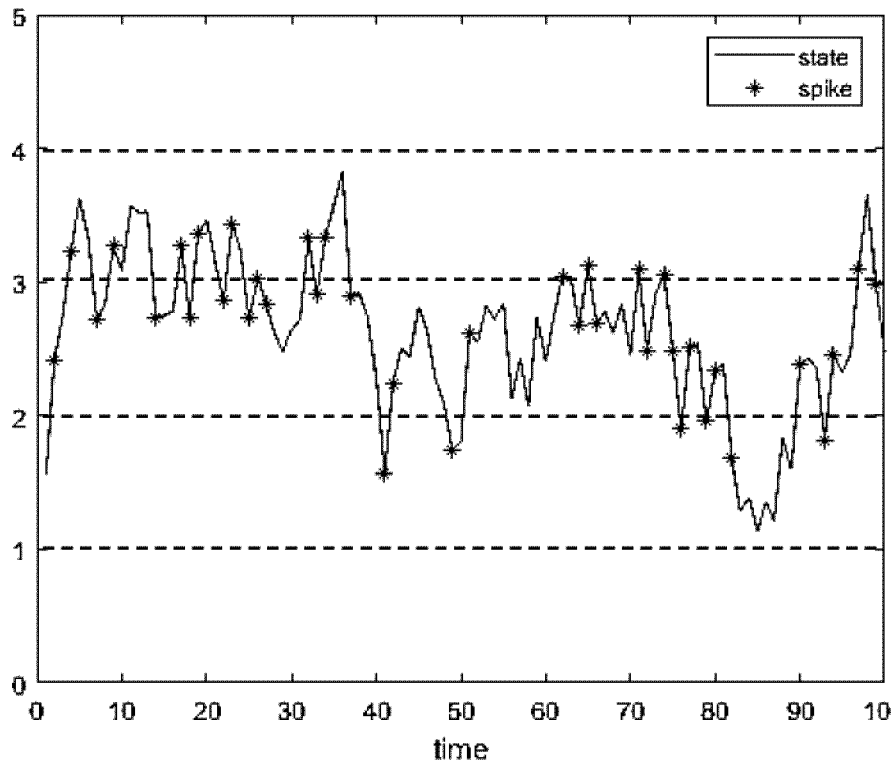
FIG. 3 schematically shows for an exemplary neural network processor element in the neural network processor operated in this manner a messaging activity in relation to its state evolution as a function of time.

FIG. 3 shows the results of a simulation, wherein the state value X(t) of a simulated neural network processor element is illustrated as a piecewise linear curve. The dotted lines therein indicate the quantization levels. Each occurrence of an output event is indicated by a star plotted on this curve. Therein the time extends a period from 0 to 100 seconds. As becomes apparent from FIG. 3 a relatively large number of 39 output events occur in this time interval. I.e. an output event resulting in an output message, occurs at every transition of a quantization level.

Figure 4:
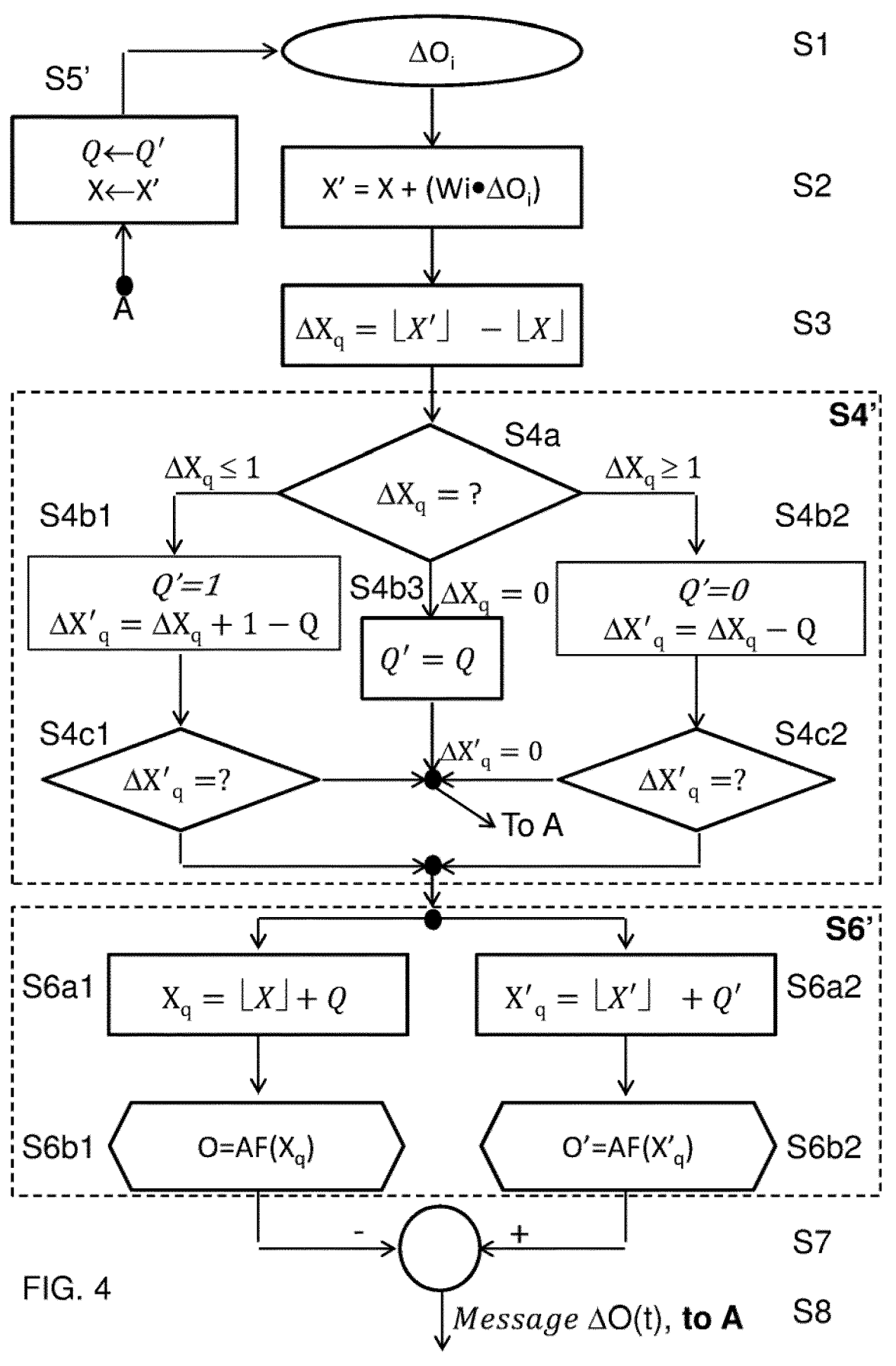

FIG. 4 shows the improved approach according to the present application. The improved approach differs from the approach of FIG. 2, in that a binary state value Q is maintained, which comes in addition to the state value X. As compared to the approach presented in the cited publication the required additional storage space is modest.

The binary state value Q is indicative for a polarity of a previous significant state change as will be explained in more detail below. The binary state value Q as well as the state value X may be initialized at an arbitrary value.

In the method of FIG. 4. steps S1, S2, S3 are identical to the steps S1, S2, S3 in the method contemplated with reference to FIG. 2. Step S4' differs from step S4 in the method shown in FIG. 2, in that it contains additional sub-steps as specified below. In sub-step S4a, it is not only determined whether the quantized difference $\Delta X_q$ is different from zero, but also for the polarity of the quantized difference $\Delta X_q$ it is determined whether it is non-zero. Dependent on the outcome of this determination in sub-step S4a, an updated binary state value Q' is assigned in one of sub-steps S4b1, S4b2, or S4b3. In sub-step S4b3, the updated binary state value Q' is set equal to the value of the original binary state value Q, i.e. the binary state value at the point in time of receiving the input message, if it is determined in sub-step S4A that the quantized difference $\Delta X_q$ is zero. In that case the procedure continues with step S5', which differs from step S5 of FIG. 2 in that not only the original state value X is reassigned as X', but that also the original binary state value Q is reassigned as Q'. It is noted that in this case, wherein Q' was set to the original binary state value, the reassignment of Q is superfluous, and can be skipped. Similarly it is not necessary to assign Q' to Q in case it is determined that the quantized difference $\Delta X_q$ is zero, so that sub-step S4b3 may be skipped.

If it is determined in sub-step S4A that the quantized difference $\Delta X_q$ is non-zero, the updated binary state value Q' is to indicate the polarity of the quantized difference $\Delta X_q$, for example, as is the case here, the value is set as Q'=1 in step S4b1 if the polarity is negative and the value is set as Q'=0 in step S4b2 if the polarity is positive. In sub-steps S4b1 or S4b2, whichever is executed in a particular case, the value of the modified quantized difference $\Delta X'_q$ is determined, wherein:

$$\Delta X'_q = \Delta X_q + Q' - Q$$

Accordingly, in case of sub-step S4b1, this reduces in this example to:

$$\Delta X'_q = \Delta X_q + 1 - Q$$

And in case of sub-step S4b2, it reduces to:

$$\Delta X'_q = \Delta X_q - Q$$

Subsequent to a sub-step S4b1 it is determined in sub-step S4c1 whether or not the value of the modified quantized difference $\Delta X'_q$ is zero. If that is the case, the procedure proceeds with step S5'. Analogously, subsequent to a sub-step S4b2 it is determined in sub-step S4c2 whether or not the value of the modified quantized difference $\Delta X'_q$ is zero. Also in that case, the procedure proceeds with step S5'.

In case it is determined in one of sub-steps S4c1, S4c2 that the value of the modified quantized difference $\Delta X'_q$ is non-zero, the procedure continues with a step S6' which differs from step S6 of FIG. 2 as follows.

In sub-step S6a1 a modified quantized state value $X_q$ is computed from the quantized state value $\lfloor X \rfloor$ and the binary state value Q as:

$$X_q = \lfloor X \rfloor + Q$$

In sub-step S6a2, which may be executed in parallel with sub-step S6a1, the modified quantized updated state value $X'_q$ is computed from the quantized updated state value $X'_q$ and the updated binary state value Q' as:

$$X'_q = \lfloor X \rfloor + Q'.$$

Then in sub-step S6b1 the first actuation function value O is computed on the basis of the quantized state value $\lfloor X \rfloor$. In particular it is computed as the value of the actuation function AF(•) for the modified quantized state value $X'_q$ i.e.

the quantized state value $\lfloor X \rfloor$ modified by addition of the binary state value Q. Analogously, in sub-step S6$b$2, which may be executed in parallel with sub-step S6$b$1, the second actuation function value O' is computed on the basis of the quantized updated state value $\lfloor X' \rfloor$. In particular it is computed as the value of the actuation function AF(•) for the modified quantized state value $X'_q$ i.e. the quantized updated state value $\lfloor X' \rfloor$ modified by addition of the updated binary state value Q'.

The actuation function is typically a monotonous bilateral saturating function such as a sigmoid function.

In step S7 corresponding to step S7 of the procedure of FIG. 2, the differential output $\Delta O_o$ is computed from the first actuation function value O and the second actuation value O' as:

$$\Delta O_o = O' - O$$

In step S8, corresponding to step S8 in FIG. 2, an output event message Message $\Delta O_o$ is transmitted to convey this differential output.

Figures 5, 5A:
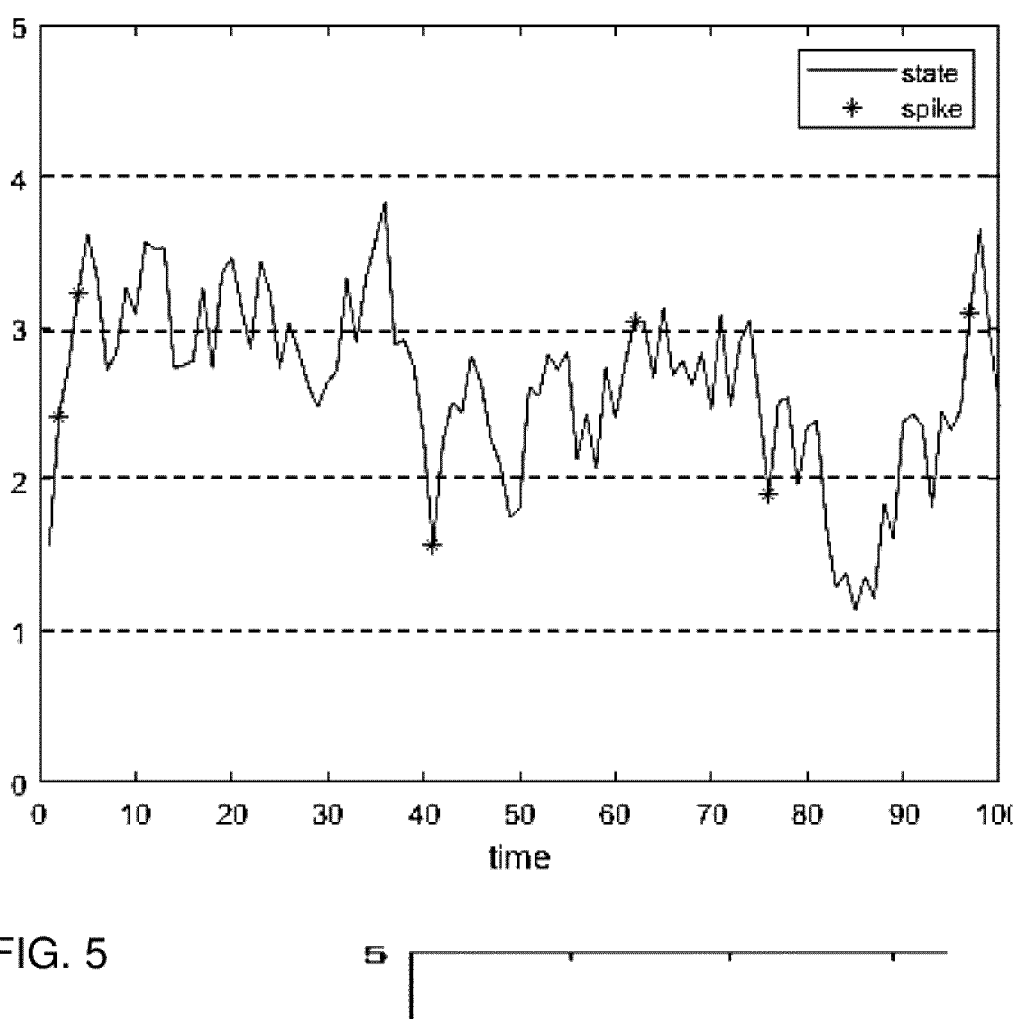
FIG. 5 schematically shows for one neural network processor element in the neural network processor operated in this manner a messaging activity in relation to its state evolution as a function of time.
FIG. 5A shows a portion of FIG. 5 in more detail.

An exemplary operation of the improved method as disclosed herein is now illustrated and described and compared with the method according to FIG. 2. FIG. 5 shows a graphical representation of an exemplary development in time of the state value X' resulting after the previous state value X was updated. FIG. 5A shows a portion of this graphical representation in more detail. Table 1 below shows the time development of the variables referred to in FIG. 4 for points in time 1 to 10. It is noted that points in time expressed herein are not necessarily equidistant. Rather the points in time are associated with respective subsequent changes of the state value X, which depend on the receipt of input messages.

Subsequently, at point in time 3, the processor element receives a new input event message as a result of which its state value increases from X=2.4 to X'=3.2. Again, the quantized difference $\Delta X_q$ indicating the difference between the quantized updated value $\lfloor X' \rfloor$ and the quantized state value $\lfloor X \rfloor$ of the recipient neural network processor element equals 1. Accordingly, in step S4$b$2, the value Q' is again set to 0 and the modified quantized difference $\Delta X'_q$ is again set to 1. Therewith the procedure continues with steps S6', S7 and S8 to emit an output message $\Delta O*(3)$ conveying the value $AF(X'_q(3))-AF(X_q(3))$. The procedure of FIG. 2 would also result in an output message $\Delta O(3)$ indicated as "+" corresponding to the quantized difference $\Delta X_q$. Subsequently in step S5' the previous state value X and the previous binary state value Q are set equal to the updated state value X' and the updated binary state value Q' respectively.

At point in time 4, when the processor element receiving a new input event message its state value increases from X=3.2 to X'=3.6. It is determined in step S4$a$, that the quantized difference $\Delta X_q$ indicating the difference between the quantized updated value $\lfloor X' \rfloor$ and the quantized state value $\lfloor X \rfloor$ of the recipient neural network processor element equals 0. Consequently, in step S4$b$3, the updated binary state value Q' assumes the value of the previous binary state value Q, so that effectively, upon proceeding with S5' the previous binary state value Q is not changed. As indicated by "NA", no output message is issued. Also, no output message would be issued by the method of FIG. 2.

At point in time 5, the processor element, receiving a new input event message, decreases its state value from X=3.6 to X'=2.8. This corresponds to a quantized difference $\Delta X_q$

TABLE 1

Time development of various variables

| t | X' | X | $\lfloor X' \rfloor$ | $\lfloor X \rfloor$ | $\Delta Xq$ | $\Delta O$ | Q | Q' | Xq | X'q | $\Delta X'q$ | $\Delta O*$ |
|---|-----|-----|---|---|----|----|---|---|---|---|----|----|
| 1 | 1.6 | 0 | 1 | 0 | 1 | + | 0 | 0 | 0 | 1 | 1 | + |
| 2 | 2.4 | 1.6 | 2 | 1 | 1 | + | 0 | 0 | 1 | 2 | 1 | + |
| 3 | 3.2 | 2.4 | 3 | 2 | 1 | + | 0 | 0 | 2 | 3 | 1 | + |
| 4 | 3.6 | 3.2 | 3 | 3 | 0 | NA | 0 | 0 | 3 | 3 | 0 | NA |
| 5 | 2.8 | 3.6 | 2 | 3 | −1 | − | 0 | 1 | 3 | 3 | 0 | NA |
| 6 | 3.2 | 2.8 | 3 | 2 | 1 | + | 1 | 0 | 3 | 3 | 0 | NA |
| 7 | 3.2 | 3.2 | 3 | 3 | 0 | NA | 0 | 0 | 3 | 3 | 0 | NA |
| 8 | 3.6 | 3.2 | 3 | 3 | 0 | NA | 0 | 0 | 3 | 3 | 0 | NA |
| 9 | 3.5 | 3.6 | 3 | 3 | 0 | NA | 0 | 0 | 3 | 3 | 0 | NA |
| 10 | 2.7 | 3.5 | 2 | 3 | −1 | − | 0 | 1 | 3 | 3 | 0 | NA |

It is presumed that the processor element has assumed a state X'=1.6 and a value Q' at point in time 1. Responsive to an input event message at point in time 2, the state value of the processor element increases to 2.4. Accordingly, the quantized difference $\Delta X_q$ indicating the difference between the quantized updated value $\lfloor X' \rfloor$ and the quantized state value $\lfloor X \rfloor$ of the recipient neural network processor element equals 1. Accordingly, in step S4$b$2, the value Q' is set to 0 and the modified quantized difference $\Delta X'_q$ is set to 1. Therewith the procedure continues with steps S6', S7 and S8 to emit an output message $\Delta O*(2)$ conveying the value $AF(X'_q(2))-AF(X_q(2))$. The "+" sign indicates a message indicative for a positive transition. The procedure of FIG. 2 would also result in an output message $\Delta O(2)$ indicated as "+" corresponding to the quantized difference $\Delta X_{ci}$. Subsequently in step S5' the previous state value X and the previous binary state value Q are set equal to the updated state value X' and the updated binary state value Q' respectively.

having a value −1. Accordingly, the procedure of FIG. 2 would provide for an output message $\Delta O(5)$ indicated as "−" corresponding to the quantized difference $\Delta X_q$. Now in step S4$b$1 of the herein proposed method, the updated binary state value Q' is set to 1, and the modified quantized difference $\Delta X'_q$ is computed as $\Delta X'_q = \Delta X_q + 1 - Q = -1 + 1 - 0 = 0$. Hence, contrary to the known method as described with reference to FIG. 2 it is avoided that an output message is issued. Instead, the procedure directly continues with step S5', where the previous state value X and the previous binary state value Q are set equal to the updated state value X' and the updated binary state value Q' respectively. Hence, the previous binary state value now equals 1.

Subsequently, at point in time 6, the processor element receives a new input event message as a result of which its state value increases from X=2.8 to X'=3.2. Again, the quantized difference $\Delta X_q$ indicating the difference between the quantized updated value $\lfloor X' \rfloor$ and the quantized state value $\lfloor X \rfloor$ of the recipient neural network processor element equals 1. Accordingly, the procedure of FIG. 2 would provide for an output message $\Delta O(6)$ indicated as "+" corresponding to the quantized difference $\Delta X_q$. However, in step S4b2, of the method as proposed herein, the value Q' is again set to 0 and with the previous binary state value Q being 1, the modified quantized difference $\Delta X'_q$ is computed as:

$$\Delta X'_q = \Delta X_q - Q = 1 - 1 = 0.$$

Hence, it is again avoided that an output message is issued. Instead, the procedure directly continues with step S5', where the previous state value X and the previous binary state value Q are set equal to the updated state value X' and the updated binary state value Q' respectively. Hence, the previous binary state value now equals 0.

When comparing FIG. 3 with FIG. 5 it can be seen that this approach renders possible a considerable reduction in the emitted number of event messages. In the example shown in FIG. 3, a message is issued at each transition of a quantization level, resulting in a total number of 39 issued messages. Contrary thereto, in the improved method, whether or not an event message is generated depends both on the change of the state value X and on the value of the state value change indicator Q. Therewith the number of event messages is substantially reduced, in this example (see FIG. 5) to 6. Therewith, the burden of messages to be transmitted and to be handled by a recipient is reduced. As shown in this example, the reduction can be substantial, e.g. with a factor of more than 6. Experiments pointed out that this did not substantially affect accuracy of the neural network computations.

Figure 6:
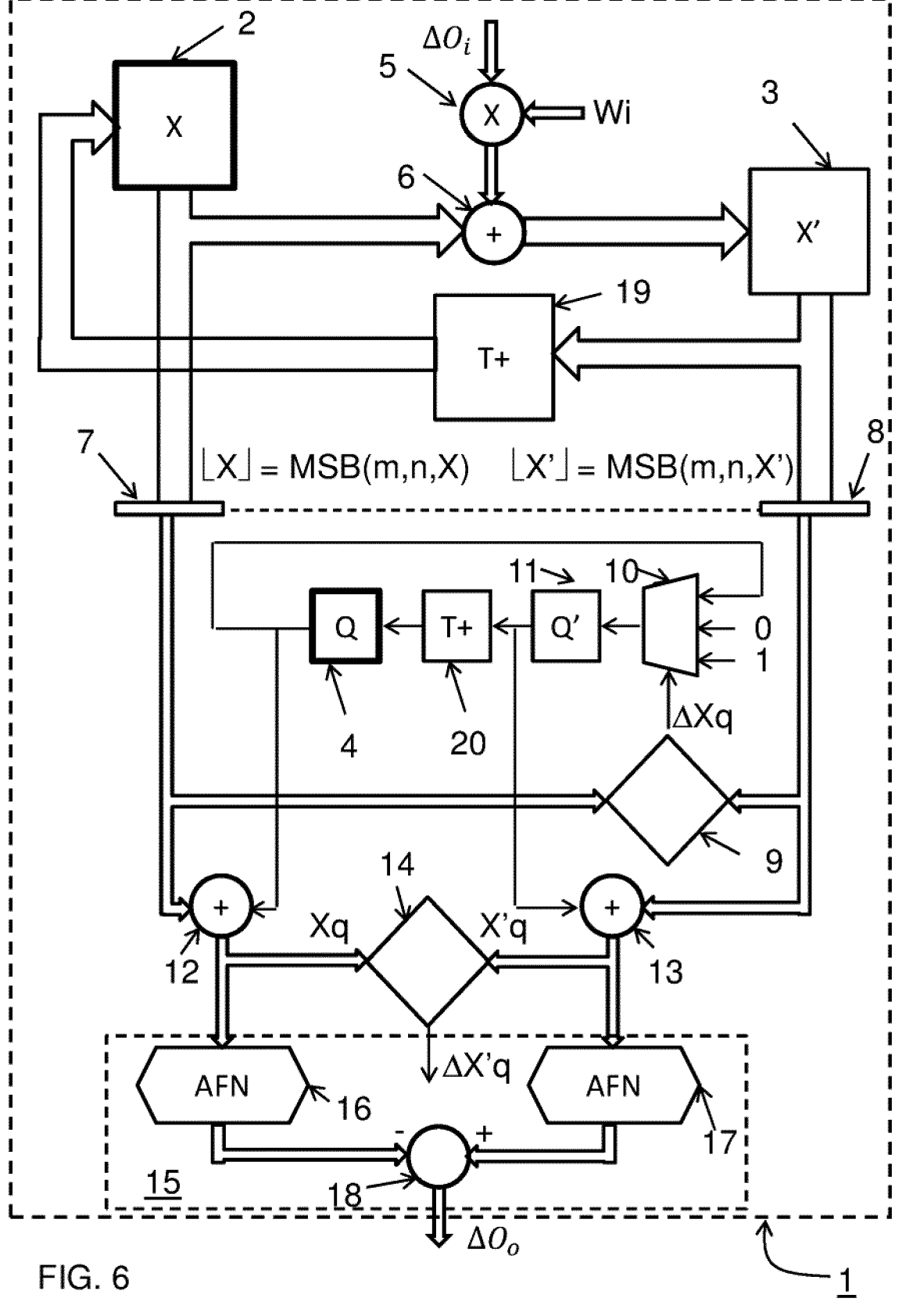
FIG. 6 shows an exemplary hardware implementation of a neural network processor element.

FIG. 6 shows an exemplary hardware implementation of a neural network processor element 1 in a neural network layer of a neural network processor, for example the neural network processor as shown in, and described with reference to FIG. 1.

The neural network processor element 1 has a respective state register 2 for storing a state value X indicative for its state. The neural network processor element 1 is capable of transmitting differential event messages indicative for a change of its state to neural network processor elements in a succeeding neural network processor layer in accordance with an activation function AFN. It is configured to compute upon receipt of an input message a new state value X' which is stored in temporary storage register 3. The neural network processor element comprises an additional state register 4 for storing a value Q of a state value change indicator that is indicative for a direction of a previous state change exceeding a threshold value. As set out in more detail below, the neural network processor element 1 selectively generates an output event message $\Delta O_o$ dependent on the change of its state value and further dependent on the value of state value change indicator.

In the exemplary embodiment the input message conveys an input value $\Delta O i$, and the neural network processor element 1 uses multiplier 5 and adder 6 to compute the new state value X' as:

$$X' = X + Wi * \Delta Oi$$

Quantization element 7 provides the quantized original state value $\lfloor X \rfloor$ of the original state value X as:

$$\lfloor X \rfloor = MSB(m,n,X)$$

In other words quantization element 7 selects the m most significant bits of the n bits representing the original state value X and passes the quantized value to comparator 9.

Analogously, Quantization element 8 provides the quantized updated state value $\lfloor X' \rfloor$ of the updated state value X' as:

$$\lfloor X' \rfloor = MSB(m,n,X'), \text{ and passes the quantized value to comparator 9.}$$

The comparator 9 issues an output signal $\Delta Xq$ which controls a selection element 10 that selects the value for updated binary state variable Q' in storage element 11. The selection element 10 is controlled by the signal $\Delta Xq$, so that it selects the input for storage element 11 as follows:

$$Q' = 1 \text{ if } \lfloor X' \rfloor - \lfloor X \rfloor \le -1$$

$$Q' = Q \text{ if } -1 < \lfloor X' \rfloor - \lfloor X \rfloor < 1$$

$$Q' = 0 \text{ if } \lfloor X' \rfloor - \lfloor X \rfloor \ge 1$$

Adder 12 computes a modified quantized original state value is Xq computed as:

$$Xq = \lfloor X \rfloor + Q$$

Likewise Adder 13 computes a modified quantized updated state value is X'q computed as:

$$X'q = \lfloor X' \rfloor + Q'$$

Comparator 14 compares these values and issues a control signal $\Delta X'q$ to control an output stage 15 with activation function elements 16, 17 and subtraction element that compute a differential output value $\Delta O_o$ to be conveyed by an output message as:

$$\Delta O_o = AFN(X'q) - AFN(Xq), \text{ wherein AFN is an activation function, for example the ReLu function.}$$

The output stage 15 is only activated by the control signal $\Delta X'q$ if the modified quantized updated state value Xq differs from the modified quantized original state value Xq.

Furthermore, the elements 12, 13, 14 are only activated if comparator 9 determines that either $\lfloor X' \rfloor - \lfloor X \rfloor \le -1$ or that $\lfloor X' \rfloor - \lfloor X \rfloor \ge 1$. If these elements are not activated than also the output stage is not activated.

Once processing is completed, i.e. if it is determined that no output message will be issued, or upon completion of issuing the output message, the value for the updated state value X' is stored in the original state value register 2 via gate 19. Likewise, the value for the updated binary state value Q' is stored in the original binary state value register 4 via gate 20.

In an embodiment, neural network processor elements 1 in a neural network layer of a neural network processor may be provided as fully autonomous units that are capable of storing their own state and to update that state in response to received input messages. Alternatively, all or part of their functionality may be shared. For example each neural network processor element may comprise a proper memory location in a shared memory unit to store its state X and its binary state Q, and a plurality of message based processor elements may share a common processor to update their states X+Q in response to received input messages.

Figure 7:
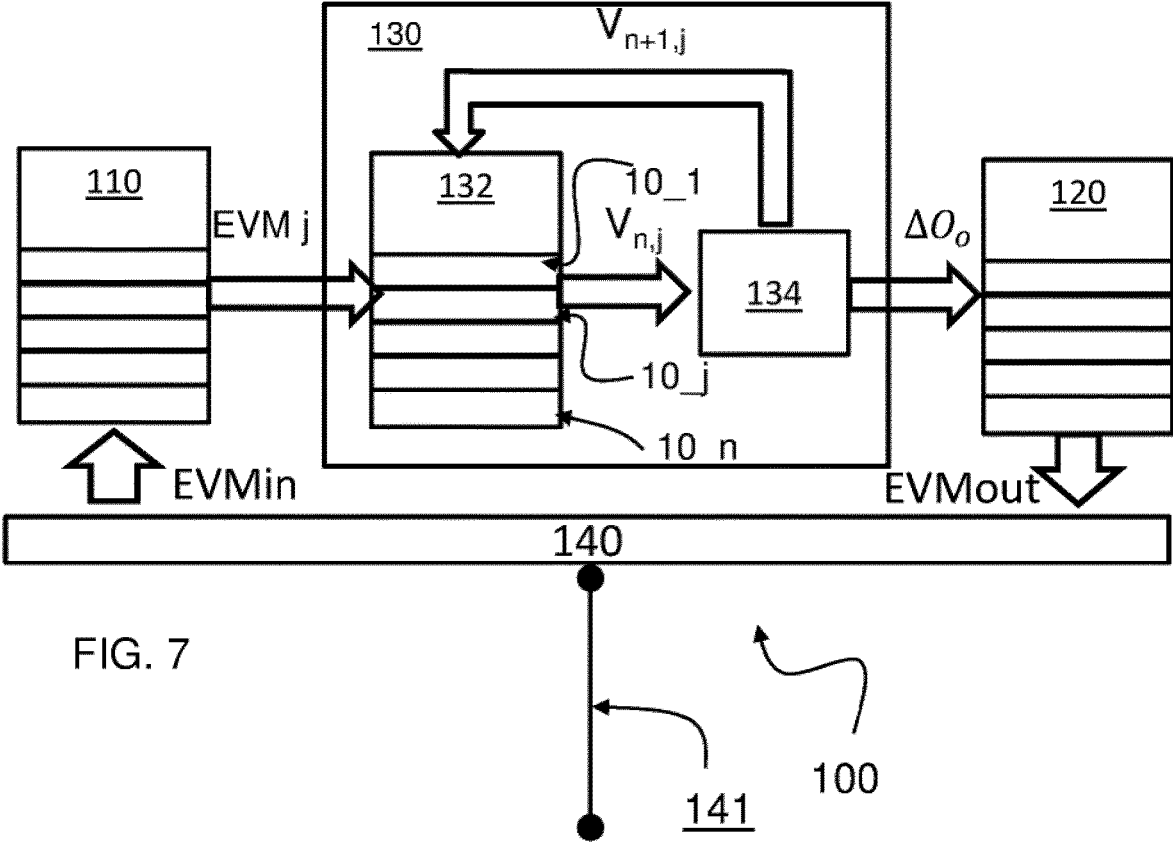
FIG. 7 shows an exemplary hardware implementation of a cluster of neural network processor elements.

An example thereof is shown in FIG. 7. Therein 100 represents a cluster of neural network processor elements, for example the neural network processor elements of a complete neural network layer. The cluster 100 has an interface 140 coupled via a link 141 to message exchange network. Therewith it can receive input messages EVMin, e.g. from a preceding neural network layer and transmit output messages EVMout, e.g. to a succeeding neural network layer.

The incoming messages are received in a message buffer 110 and provided as internal messages EVMj to individual neural network processor elements j in a core 130. In the embodiment shown the core 130 comprises a memory unit 132, wherein each addressable location 10_1, . . . , 10_j, . . . , 10_n, comprises a state Vn,j of a neural network processor element j at point in time n. The state Vn,j includes the state value X and the binary state value Q referred to above. The core 130 further comprises a shared computation unit 134 which is provided to update a state Vn,j stored in a location 10_j to updated state Vn+1,j in response to an input message EVM j and to control an output unit 120, to selectively generate an output event message EVMout conveying a difference $\Delta O_o$ dependent on the change of state, dependent both the state value X and the binary state value Q as a result of said updating. The output unit 120 properly addresses the message to be transmitted by the message exchange network to one or more recipients, e.g. neural network processor elements in a subsequent neural network layer.

Figure 8:
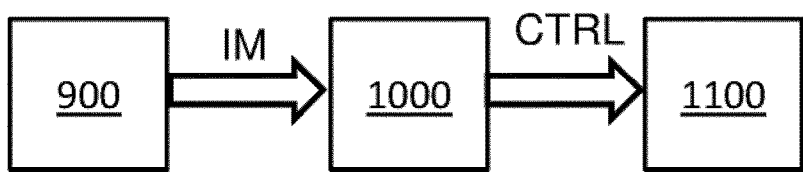
FIG. 8 shows a controlled device.

A neural network processor, e.g. the neural network processor 1000 shown in FIG. 1 may be employed as a control system in a controlled device, e.g. a vehicle. As schematically shown in FIG. 8, the controlled device further comprises at least one sensor unit, to provide sensor data, e.g. an image acquisition unit 900 to provide image data IM to said control system 1000 and a device 1100, e.g. a vehicle to receive device control signals CTRL from the control system.

It is noted that a shared computation unit 134 may have various embodiments, for example an embodiment in the form of dedicated hardware, for example an element as shown in FIG. 6, which generally is most energy efficient and may provide a high computational speed. Alternatively, the shared computation unit 134 may be provided as a partly or fully programmable processor, for example a general purpose processor capable to perform the method of FIG. 4, which allows for more flexibility.

The invention claimed is:

1. A neural network processor comprising a plurality of neural network processor elements, each having a state register for storing a state value indicative of neural network processor element state and an additional state register for storing a value of a state value change indicator, wherein in response to receiving an input event message from another neural network processor element, a neural network processor element of the plurality of neural network processor elements performs operations comprising:

computing a new state value based on the input event message, and selectively generating an output event message dependent on a modified quantized difference differing from 0, wherein a quantized difference is equal to a difference between a quantized value of the new state value and a quantized value of the state value, wherein the value of the state value change indicator is indicative of a previous polarity of a previous quantized difference for which the value of the state value change indicator differed from 0, wherein the modified quantized difference is equal to a sum of the quantized difference and a modification value dependent on a current polarity of the quantized difference and the previous polarity indicated by the state value change indicator, and wherein the modification value is:

0 based on the current polarity being equal to the previous polarity, 1 based on the current polarity being negative and the previous polarity being positive, or −1 based on the current polarity being positive and the previous polarity being negative.

2. The neural network processor according to claim 1, wherein the plurality of neural network processor elements is organized as a cluster, and wherein the plurality of neural network processor elements shares a common computation unit.

3. The neural network processor according to claim 2, wherein the plurality of neural network processor elements organized in the cluster further shares a common message buffer.

4. The neural network processor according to claim 2, wherein the plurality of neural network processor elements organized in the cluster further shares a common output unit.

5. The neural network processor according to claim 2, wherein the plurality of neural network processor elements organized in the cluster further shares a common network interface.

6. The neural network processor according to claim 2, wherein the plurality of neural network processor elements organized in the cluster form a neural network processor layer in the neural network processor.

7. The neural network processor according to claim 1, wherein the neural network processor element comprises:

a first computation section to compute a control signal indicative of compliance with a first predetermined change condition related to the state value of the neural network processor element, a second computation section to compute a modified control signal indicative of compliance with a second predetermined change condition that accounts for a previous predetermined change, and a third computation section to generate the output event message, wherein the third computation section is activated based on compliance with the first predetermined change condition and the second predetermined change condition.

8. A control system comprising:

a neural network processor comprising a plurality of neural network processor elements, each having a state register for storing a state value indicative of neural network processor element state and an additional state register for storing a value of a state value change indicator, wherein, in response to receiving an input event message from another neural network processor element, a neural network processor element of the plurality of neural network processor elements performs operations comprising:

computing a new state value based on the input event message, and selectively generating an output event message dependent on a modified quantized difference differing from 0, wherein a quantized difference is equal to a difference between a quantized value of the new state value and a quantized value of the state value, wherein the value of the state value change indicator is indicative of a previous polarity of a previous quantized difference for which the value of the state value change indicator differed from 0, wherein the modified quantized difference is equal to a sum of the quantized difference and a modification value dependent on a current polarity of the quantized difference and the previous polarity indicated by the state value change indicator, and wherein the modification value is:

0 based on the current polarity being equal to the previous polarity, 1 based on the current polarity being negative and the previous polarity being positive, or −1 based on the current polarity being positive and the previous polarity being negative;

an input to receive sensor data; and an output to provide device control signals for a device.

9. The control system according to claim 8, further comprising a normalization unit to normalize the received sensor data.

10. The control system according to claim 8, further comprising an event generation unit to convert the received sensor data into event data.

11. A controlled device comprising:

a control system according to claim 8; and at least one sensor unit to provide the sensor data to the control system.

12. A neural network processing method carried out by a neural network processor comprising a plurality of neural network processor elements, each having a state register for storing a state value indicative of neural network processor element state and an additional state register for storing a value of a state value change indicator, the neural network processing method comprising:

receiving an input event message by a neural network processor element of the plurality of neural network processor elements;

computing a new state value of the neural network processor element state based on the input event message;

selectively generating an output event message dependent on a modified quantized difference differing from 0, wherein a quantized difference is equal to a difference between a quantized value of the new state value and a quantized value of the state value;

wherein the value of the state value change indicator is indicative of a previous polarity of a previous quantized difference for which the value of the state value change indicator differed from 0, wherein the modified quantized difference is equal to a sum of the quantized difference and a modification value dependent on a current polarity of the quantized difference and the previous polarity indicated by the state value change indicator, and wherein the modification value is:

0 based on the current polarity being equal to the previous polarity, 1 based on the current polarity being negative and the previous polarity being positive, or −1 based on the current polarity being positive and the previous polarity being negative.

13. The neural network processing method of claim 12, wherein selectively generating the output event message includes not generating the output event message based on an absolute value of the quantized difference being less than 1.

14. The neural network processing method of claim 13, comprising, subject to the absolute value of the quantized difference being greater than or equal to 1:

selectively generating the output event message subject to a condition that an absolute value of the modified quantized difference is greater than or equal to 1.

15. The neural network processor according to claim 3, wherein the plurality of neural network processor elements organized in the cluster further shares a common output unit.

16. The neural network processor according to claim 3, wherein the plurality of neural network processor elements organized in the cluster further shares a common network interface.

17. The neural network processor according to claim 4, wherein the plurality of neural network processor elements organized in the cluster further shares a common network interface.

18. The neural network processor according to claim 3, wherein the plurality of neural network processor elements organized in the cluster form a neural network processor layer in the neural network processor.

19. The neural network processor according to claim 4, wherein the plurality of neural network processor elements organized in the cluster form a neural network processor layer in the neural network processor.

20. The neural network processor according to claim 5, wherein the plurality of neural network processor elements organized in the cluster form a neural network processor layer in the neural network processor.

* * * * *